United States Patent Office 3,156,692
Patented Nov. 10, 1964

3,156,692
5-BASICALLY SUBSTITUTED DIBENZAZEPINE COMPOUNDS
Louis Müslin, Basel, Walter Schindler, Riehen, near Basel, and Franz Häfliger, Basel, Switzerland, assignors to Geigy Chemical Corporation, Ardsley, N.Y., a corporation of Delaware
No Drawing. Filed June 23, 1959, Ser. No. 822,185
Claims priority, application Switzerland July 23, 1958
9 Claims. (Cl. 260—293)

The present invention concerns new basically substituted azepine derivatives having valuable pharmacological properties, as well as processes for the production thereof.

It has been found that N-substituted azepine derivatives of the general formula

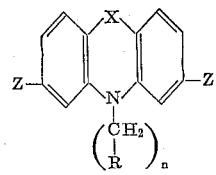  (I)

wherein X represents a member selected from the group consisting of the ethylene —$CH_2$—$CH_2$— and vinylene —CH=CH— group,
Z represents the same member selected from the group consisting of hydrogen and the chlorine atom,
R is a member selected from the group consisting of an N-lower alkyl-pyrrolidyl and an N-lower alkyl-piperidyl radical, and $n$ is one of the numerals 0, 1 or 2, have valuable pharmacological properties. They are used as antiallergics, sedatives, anticonvulsives, spasmolytics and serotonin antagonistics. In addition, they can be used to potentiate the effect of medicaments, e.g. of anaesthetics. Those azepine derivatives according to the invention are preferred, the pyrrolidyl or piperidyl radicals of which are N-methyl substituted. Quaternary ammonium salts which are derived from the tertiary bases defined above, have ganglion-blocking activity.

The new compounds are produced by reacting an azepine derivative of the general formula

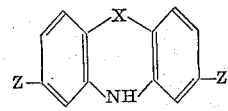  (II)

i.e. a possibly substituted 5H-dibenz[b,f]azepine or 10,11-dihydro-5H-dibenz[b,f]azepine with a reactive ester of a basic alcohol of the general formula <p align="center">HO—Y—R    (III)</p> wherein X, Z, Y and R have the meanings given above, the reaction being performed in the presence of an acid binding agent.

Sodium amide, sodium hydride, lithium amide, potassium amide, sodium, lithium or potassium in particular are suitable as acid binding agents. As reactive esters of basic alcohols of the general Formula III, in particular the halides, also e.g. aryl sulphonic acid esters, are used; individually can be named: 1-methyl-3-chloro-piperidine, 1-methyl-4-chloro-piperidine, 1-methyl-pyrrolidyl-(2)-methyl chloride, 1-methyl-piperidyl-(2)-methyl chloride, 1-methyl-piperidyl-(3)-methyl chloride, 1-methyl-piperidyl-(4)-methyl chloride, β-(1-methyl-piperidyl-(2))-ethyl chloride as well as the corresponding bromides.

Suitable starting materials of the general Formula II are 10,11-dihydro-5H-dibenz[b,f]azepine and 5H-dibenz[b,f]azepine as well as 3,7-dichloro-10,11-dihydro-5H-dibenz[b,f]azepine and 3,7-dichloro-5H-dibenz[b,f]azepine.

The new N-substituted azepine derivatives of the general Formula I can also be produced by reacting phosgene with an azepine derivative of the general Formula II, possibly in the presence of an acid binding agent, reacting the 5-chlorocarbonyl azepine derivative obtained with a basic alcohol of the general Formula III and heating the 5-substituted azepine derivative of the general formula

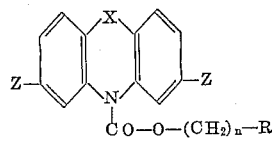  (IV)

obtained until carbon dioxide is split off.

Compounds of the general Formula I can be produced by a third process by treating compounds of the general formula

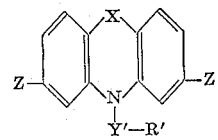  (V)

wherein Y' stands for —$(CH_2)_n$— or —$COCH_2$—, $n$ having the precedingly-recited significances, and R' has the same significance as R or represents an R radical wherein a methylene group bound at a nitrogen atom is replaced by —CO—, there being at least one —CO— group in —Y'—R', and
X and Z have the meanings given above, with an alkali metal-earth metal hydride, in particular with lithium-aluminium hydride.

As starting materials of the general Formula V in which the CO group is contained in Y' the 10,11-dihydro-5H-dibenz[b,f]azepines and 5H-dibenz[b,f]azepines acylated in the 5-position by N-methyl-pipecolinic acid, N-methyl-nipecotic acid or N-methyl isonipecotic acid can be named, and 10,11-dihydro-5H-dibenz[b,f]azepines and 5H-dibenz[b,f]azepines acylated in the 5-position by N-methyl-pyrrolidone carboxylic acid can be named as starting materials in which CO groups are contained in Y' and R'.

By the addition of halides or sulphates of aliphatic or araliphatic alcohols, for example of methyl iodide, dimethyl sulphate, ethyl bromide, ethyl iodide, or benzyl chloride, monoquaternary ammonium compounds are obtained from the tertiary amines of the general Formula I in the usual way whereby the tertiary amino group in the radical R reacts.

The tertiary bases form salts, some of which are water soluble, with inorganic or organic acids such as hydrochloric acid, hydrobromic acid, sulphuric acid, phosphoric acid, methane sulphonic acid, ethane sulphonic acid, ethane disulphonic acid, acetic acid, succinic acid, fumaric acid, maleic acid, malic acid, tartaric acid, citric acid, benzoic acid and phthalic acid.

The compounds according to the present invention may be administered, for example, perorally, in daily doses of 100 mg. to 600 mg., in the form of tablets or dragees containing, for example, 50–100 mg. of active substance.

The following examples further illustrate the production of the new compounds. Parts are given as parts

Example 1

19.5 parts of 10,11-dihydro-5H-dibenz[b,f]azepine are dissolved in 125 parts by volume of o-xylene and 3.9 parts of finely pulverized sodium amide are added. The suspension obtained is heated at 100° while stirring and introducing nitrogen until no more ammonia is developed. The contents of the flask are then cooled to 50° and at this temperature, a solution of 13.4 parts of 1-methyl-3-chloro-piperidine in 60 parts by volume of o-xylene is added dropwise. The suspension is then stirred for 2 hours at 100° and afterwards refluxed for 14 hours. The reaction mixture is cooled to 0°, water is added dropwise and the whole is stirred well for 2 hours. The two phases are separated and the organic phase is extracted with 1 N-hydrochloric acid. The aqueous acid extract is made alkaline and ethered out, the ether is evaporated off and the oil which remains is fractionated in a high vacuum. 5-(1'-methyl-piperidyl-(3'))-10,11-dihydro-5H-dibenz[b,f]azepine is obtained. B.P. 165–167° under 0.02 mm. pressure.

Instead of sodium amide, also lithium amide, potassium amide and sodium hydride can be used in the above example.

5-(1'-methyl-piperidyl-(4'))-10,11-dihydro - 5H - dibenz[b,f]azepine, B.P.$_{0.02}$ 151–154°;

5-(1'-methyl-piperidyl-(3')-methyl)-10,11 - dihydro - 5H-dibenz[b,f]azepine, B.P.$_{0.01}$ 157–160°;

5-[β-(1'-methyl-piperidyl-(2'))-ethyl] - 10,11 - dihydro-5H-dibenz[b,f]azepine, P.B.$_{0.003}$ 178–181°;

5 - (1' - methyl - pyrrolidyl - (2')-methyl)-10,11-dihydro-5H-dibenz[b,f]azepine, B.P.$_{0.01}$ 145–147°;

5-(1'-methyl-pyrrolidyl-(3') - methyl) - 10,11 - dihydro-5H-dibenz[b,f]azepine;

5-(1'-methyl-piperidyl - (3')-methyl) - 5H - dibenz[b,f]azepine, B.P.$_{0.01}$ 166–169°;

5 - (1' - methyl-piperidyl-(2')-ethyl)-3,7-dichloro-10,11-dihydro-5H-dibenz[b,f]azepine, B.P.$_{0.01}$ 195–197°; and 5-(1'-methyl-piperidyl-(4')-methyl)-3,7-dichloro - 10,11-dihydro-5H-dibenz[b,f]azepine B.P.$_{0.01}$ 190–192° are obtained in an analogous manner.

Example 2

19.5 parts of 10,11-dihydro-5H-dibenz[b,f]azepine are dissolved in 100 parts by volume of benzene. Nitrogen is introduced into the solution and 3.9 parts of sodium amide are added. The contents of the flask are then heated to 80° until no more ammonia develops and then cooled to 45°. A solution of 14.8 parts of 1-methyl-piperidyl-(2)-methyl chloride in 200 parts by volume of benzene is added dropwise to the suspension obtained within one and a half hours. The reaction mixture is then stirred for 12 hours at 45° and afterwards refluxed for 2 hours. Water is added to the mixture which has been quickly cooled to 5°, the whole is stirred for 2 hours and the two phases are separated. The benzene phase is extracted with 1 N-hydrochloric acid. The acid aqueous extract is made alkaline to mimosa paper with caustic soda lye and ethered out. After drying the ethereal solution with potassium carbonate, the ether is evaporated off and the residue is fractionated in a high vacuum whereupon 5-(1'-methyl-piperidyl-(2')-methyl)-10,11-dihydro-5H-dibenz[b,f]azepine passes over at 165–167° under 0.02 mm. pressure.

5-(1'-methyl-piperidyl-(4')-methyl) - 10,11 - dihydro-5H-dibenz[b,f]azepine, B.P.$_{0.02}$ 172–174° is obtained in an analogous manner.

Example 3

19.3 parts of 5-H-dibenz[b,f]azepine are dissolved in 500 parts by volume of benzene at 50–60°. First a solution of 14.8 parts of N-methyl-4-pipecolyl chloride in 400 parts by volume of benzene and then a paste of 4.0 parts of sodium amide in 12 parts by volume of toluene are added dropwise to this solution while stirring and introducing nitrogen. The suspension obtained is heated for another 7 hours at 45° and then refluxed for 14 hours. After cooling with ice, 400 parts of water are added to the reaction mixture at 0–5°. The two phases are separated and the alkaline-aqueous phase is shaken out well with ether. The ether solution is combined with the benzene phase and both are extracted with 1-N-hydrochloric acid. The hydrochloric acid extract is then made alkaline with caustic soda lye and ethered out. The ether solution is dried with sodium carbonate and the ether is then evaporated off. The crude oil which remains is distilled in a high vacuum, whereupon 5-(1'-methyl-piperidyl-(4')-methyl)-5H-dibenz[b,f]azepine is obtained. B.P. 176–177° under 0.025 mm. pressure.

5-(1'-methyl-piperidyl-(2')-methyl - 5H - dibenz[b,f]azepine, B.P.$_{0.05}$ 169–172° is obtained in an analogous manner.

Example 4

19.3 parts of 5H-dibenz[b,f]azepine are dissolved in 600 parts by volume of xylene at 50–60°. 16.2 parts of β-(1-methyl-piperidyl-(2))-ethyl chloride dissolved in 400 parts by volume of xylene are added dropwise to this solution. A paste of 4.0 parts of sodium amide in 12 parts by volume of toluene is then added to the reaction mixture, the whole is stirred for 7 hours at 55° and then refluxed for 14 hours. It is then cooled to 0° with ice and the product is worked up as described in the previous examples. 5-[β-(1'-methyl-piperidyl-(2'))-ethyl]-5H-dibenz[b,f]azepine is obtained. B.P. 170–172° under 0.004 mm. pressure.

Example 5

19.5 parts of 10,11-dihydro-5H-dibenz[b,f]azepine are quickly added to a boiling solution of 14.1 parts of nicotinoyl chloride in 120 parts of abs. benzene. After refluxing for a further 20 minutes, the reaction mixture is cooled to room temperature and the precipitate formed is filtered off. This is almost pure 5-nicotinoyl-10,11- dihydro-5H-dibenz[b,f]azepine hydrochloride. After recrystallizing twice from ethanol, it melts at 201–203°.

On liberating with potash and shaking out with chloroform, the free base is obtained which, after recrystallizing from alcohol, melts at 125–127°.

A mixture of 30 parts of 5-nicotinoyl-10,11-dihydro-5H-dibenz[b,f]azepine and 14.5 parts of methyl iodide in 100 parts by volume of abs. benzene is kept for 4 hours at 40–50° and is then refluxed for 2 hours. The reaction mixture is cooled to room temperature and then stirred well for 14 hours at room temperature with 100 parts of water and 14.7 parts of silver chloride. The silver iodide formed is removed by filtration and the filtrate is evaporated to dryness. The dry residue is dissolved in 100 parts of abs. ethanol and then hydrogenated at 40–60 atmospheres and 40–100° with Pt–C as catalyst. After removal of the catalyst and evaporating off the solvent, the hydrochloride of 5-(1'-methyl-hexahydronicotinoyl) - 10,11 - dihydro-5H-dibenz[b,f]azepine remains which melts at 153–155°.

Instead of the methochloride, the metho-iodide can also be hydrogenated.

32 parts of 5-(1'-methyl-hexahydronicotinoyl)-10,11-dihydro-5H-dibenz[b,f]azepine dissolved in 600 parts of abs. ether are added dropwise to the boiling solution of 3.8 parts of lithium-aluminium hydride in 1000 parts of abs. ether. The whole is stirred for another 6 hours under reflux in a nitrogen atmosphere. The reaction mixture is then cooled to 0° and worked up in the usual way. The 5 - (1'-methyl-piperidyl-(3')-methyl)-10,11-dihydro-5H-dibenz[b,f]azepine is obtained which boils at either 157–160° under 0.01 mm. pressure or 141–143° under 0.004 mm. pressure.

What we claim is:
1. Basically substituted azepine of the formula

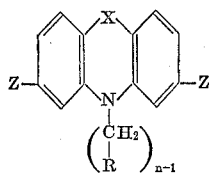

wherein X represents a member selected from the group consisting of the —CH$_2$—CH$_2$— and —CH=CH— groups, Z represents the same member selected from the group consisting of hydrogen and the chlorine atom, R is a member selected from the group consisting of N-lower alkyl-pyrrolidyl and N-lower alkyl-piperidyl, and $n$ is a whole number from 1 to 3 inclusive.

2. The compound of the formula:

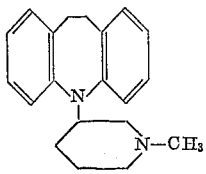

3. 5-[β-(1'-methyl-piperidyl-(2') - ethyl)]-10,11 - dihydro-5H-dibenz[b,f]azepine.

4. 5-(1'-methyl - pyrrolidyl-(2')-methyl) - 10,11-dihydro-5H-dibenz[b,f]azepine.

5. 5-(1'-methyl-piperidyl-(2')-methyl)-10,11 - dihydro-5H-dibenz[b,f]azepine.

6. 5-(1'-methyl-pyrrolidyl-(3')-methyl)-10,11 - dihydro-5H-dibenz[b,f]azepine.

7. 5-[β-(1'-methyl-piperidyl-(2')-ethyl)] - 5H - dibenz[b,f]azepine.

8. 5-(1'-methyl-piperidyl-(3')-methyl) - 10,11 - dihydro-5H-dibenz[b,f]azepine.

9. 5-(N - methyl-3-piperidylmethyl) - 5H-dibenz[b,f]azepine.

References Cited in the file of this patent
UNITED STATES PATENTS

| | | |
|---|---|---|
| 2,554,736 | Haefliger et al. | May 29, 1951 |
| 2,813,857 | Schindler | Nov. 19, 1957 |